various patents and figure

United States Patent [19]

Pickle

[11] Patent Number: 5,702,226
[45] Date of Patent: Dec. 30, 1997

[54] TIRE DOLLY

[76] Inventor: David Pickle, 602 S. Jules, Cleveland, Okla. 74020

[21] Appl. No.: 701,323

[22] Filed: Aug. 22, 1996

[51] Int. Cl.⁶ .................................................. B62B 1/10
[52] U.S. Cl. ........................ 414/426; 280/79.4; 414/428
[58] Field of Search .............................. 414/426, 427, 414/428, 429, 430; 280/79.4

[56] References Cited

U.S. PATENT DOCUMENTS

| 2,207,443 | 7/1940 | Schneider | 414/428 |
| 2,525,437 | 10/1950 | Winzler et al | 414/427 |
| 2,543,276 | 2/1951 | Buechler | 414/428 |
| 2,546,509 | 3/1951 | Huff | 414/428 |
| 5,433,469 | 7/1995 | Cassels | 414/430 |
| 5,562,389 | 10/1996 | Mitchell | 414/426 |

FOREIGN PATENT DOCUMENTS

| 9007432 | 7/1990 | WIPO | 414/426 |

*Primary Examiner*—Thomas J. Brahan

[57] ABSTRACT

The present invention relates to a tire dolly (10) comprising a cross member (12) which comprises a cross member axle (12A). The cross member (12) further comprises a cross member left tire (12CL) securely mounted on a left distal end of the cross member axle (12A) by a cross member left axle cap (12AL) and a cross member right tire (12CR) securely mounted on a right distal end of the cross member axle (12A) by a cross member right axle cap (12AR). The tire dolly (10) further comprises a left fork (14L) which comprises a left fork shaft (14LA) securely mounted at an inner distal end onto the cross member (12). The left fork (14L) further comprises a left fork roller (14LB) rotatably longitudinally disposed upon the left fork shaft (14LA). The left fork (14L) further comprises a left fork cap (14LD) securely mounted at an outer distal end of the left fork shaft (14LA) functioning to retain the left fork roller (14LB) thereon. The tire dolly (10) further comprises a right fork (14R) which comprises a right fork shaft (14RA) securely mounted at an inner distal end onto the cross member (12). The right fork (14R) further comprises a right fork roller (14RB) rotatably longitudinally disposed upon the right fork shaft (14RA). The right fork (14R) further comprises a right fork cap (14RD) securely mounted at an outer distal end of the right fork shaft (14RA) functioning to retain the right fork roller (14RB) thereon. The tire dolly (10) further comprises a handle (16) securely mounted onto the cross member (12).

1 Claim, 1 Drawing Sheet

TIRE DOLLY

BACKGROUND OF THE INVENTION

1. Field of the Invention

The present invention relates to a tire dolly. More particularly, the present invention relates to a tire dolly which is capable of lifting and rotating a tire to align lug holes in the rim to the lug bolts extending from the drum or disk.

2. Description of the Prior Art

The prior art describes tire handling tools that are capable of transporting a tire to a location and lifting the tire to the proper height of attachment to lug bolts but all prior art devices lack rotatably of the tire once it is lifted to position and align the lug bolts to the lug holes within the rim of the tire.

Numerous innovations for tire handling tools have been provided in the prior art that are described as follows. Even though these innovations may be suitable for the specific individual purposes to which they address, they differ from the present invention as hereinafter contrasted.

In U.S. Pat. No. 5,466,026, titled Tire Lifter Apparatus, invented by Timothy L. Steiner, a tire lifting apparatus includes a lever member having a first lever arm portion and a second lever arm portion. The second lever arm portion lies contiguous to an apparatus plane. A fulcrum assembly is connected to the lever member into the first lever arm portion and the second lever arm portion. a clamp assembly is pivotally connected to the fulcrum assembly. The clamp assembly lies contiguous to the apparatus plane and the clamp assembly is adapted to clamp on to a tire which is contiguous to a tire plane which is perpendicular to the apparatus plane. A stop member is contiguous to the apparatus plane [plane The clamp assembly includes a first clamp member which is connected to the fulcrum assembly and which is oriented substantially perpendicular to the lever member in the apparatus plane. A jaw member is connected at a perpendicular orientation to the first clamp member at a distal end of a first clamp member in the apparatus plane. The jaw member extends from the first clamp member toward a distal end of the lever member. The fulcrum is connected to the lever member by a first connection, and the fulcrum assembly is connected to the clamp assembly by a second connection.

The patented invention differs from the present invention because the patented invention lifts a tire from horizontal to vertical but has no provisions to transport once vertical. The present invention lifts a tire already in the vertical position. The present invention further has provisions to easily rotate a tire, enabling aligning the tire with the mounting means.

In U.S. Pat. No. 5,367,732, titled Tire Handling Tool, invented by Donald R. Suggs, Sr., a tire handling tool for manipulating a wheel-mounted tire while installing or removing it from a vehicle comprises a single steel bar bent to from a forked, substantially planer, elongated body having a longitudinal axis bifurcated at a waist, a handle section adjacent the waist and terminating in a transverse grip opposite the plate, the tool having a tine section adjacent the waist and extending coplanar with and opposite the handle section, the tine section formed by two divergent extensions of the steel bar segments forming the handle section, each line having a traction means on one side for engaging a thread of a tire. The plate may have a driver stud for attaching a socket wrench extension perpendicular to the plate for tightening and loosening lug nuts. The plate may further include a spin handle opposite the driver stud to facilitate spinning the nuts onto and off of the lugs.

The patented invention differs from the present invention because the patented invention requires positioning a tire adjacent to an axil before use, it does not have transport means. The patented invention functions to lift a tire but does not have provisions to easily rotate the tire so the mounting means is in alignment thereof. The patented invention has provisions for holding a lug wrench while tightening the lug nuts. The present invention is a simplified not having a lug wrench holder. The present invention lifts a tire (positioned vertically) and allows the user to roll the tire on the wheels to the location of the vehicle, then align the tire with the mounting means. The handle is pushed downward to raise tire, and handle is raised to lower the tire for ease in mating with the mounting means. The handle also folds forward between the forks for compact storage.

In U.S. Pat. No. 5,180,141, titled Tool for Handling Wheel Assemblies and Method for Manipulation Thereof, invented by Thomas R. Hunt, a tool for removing from a vehicle axle a wheel-tire assembly or replacing the assembly thereupon and for maneuvering the assembly form a horizontal position to a vertical position, all with minimal effort. The tool includes a wheel support section for supporting the wheel-tire assembly during removal and replacement of the assembly, a leverage section for transmitting forces exerted by an operator, and a handle section for manipulation by the operator. The handle section has a hooked portion which is inserted between the wheel tire assembly and a work area for the purpose of manipulating the assembly. The invention includes a method for manipulating the tool so that the tire wheel assembly may be readily maneuvered into desired operating positions with exertion of minimal effort.

The patented invention differs from the present invention because the patented invention slides a tire from one location to another, it does not roll on wheels. The patented invention does not easily roll the tire once it is in position to facilitate alignment of the mating means on the tire with the mounting mean on the vehicle. The present invention has wheels to support the tire making it easily rolled to from position to position. Furthermore, the present invention comprises a folding handle for compact storage and rollers which allow easy mating of the mounting means.

In U.S. Pat. No. 3,973,283, titled Tire Change Assist Tool, invented by Arnold Boe, a tire changing assist tool to facilitate mounting and de-mounting a wheel-carried tire on axle lugs. The invention comprises such a tool comprising an axially elongated rigid bar; socket means forming a wrench at one end of the bar adapted for axle lug nut engagement, means defining a fulcrum axially of the bar and terminally opposite the socket end thereof, and bar side arm means between the bar ends operatively associated with the fulcrum to support the wheel and tire for universal movement in ground elevated relation responsive to the bar pivoting on the fulcrum and within the wheel locus of registration with the axle lugs.

The patented invention differs from the present invention because the patented invention, while having provision to raise a tire into position, requires dragging the tire to transport it. The present invention incorporates a roller means to rotate the tire once positioned in horizontal alignment with the mounting means. The present invention further includes wheels to facilitate transporting the tire. The lever member of the present invention functions a handle and lever acting against a fulcrum to lift the tire vertically.

In Des. Pat. No. 347,981, titled Tire Lifting and Handling Tool, invented by Donald R. Suggs is an ornamental design of a simple 'y' shaped device to position a tire vertically. It does not have wheel, rollers, or a lever acting against a fulcrum. Further the patented invention does not fold for storage.

Numerous innovations for tire handling tools have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a tire dolly. More particularly, the present invention relates to a tire dolly which is capable of lifting and rotating a tire to align lug holes in the rim to the lug bolts extending from the drum or disk. The advantages of the present invention are as follows:

A) no manual lifting of heavy tires and rims
B) no awkward maneuvering to align lug bolts with lug bolt holes in rim
C) lightweight and compact for easy storage due to pivotal handle
D) ergonomically designed which virtually eliminates the risk of back injury
E) easily utilized by physically challenged people utilizing the fulcrum effect
F) can be utilized for personal as well as professional use
G) safer to utilize because a person ho longer has to place any portion of his/her body under the vehicle to lift heavy tires onto the lug bolts
H) can be utilized to remove tire from lug bolts or take pressure off of tire attached to lug bolts to facilitate removal of the lug nuts The types of problems encountered in the prior art are once a tire is transported to a site of attachment via a prior art tire handling tool, the tire must be awkwardly maneuvered to align lug bolts with lug bolt holes in the rim.

In the prior art, unsuccessful attempts to solve this problem were attempted namely: rotate the tires prior to lifting. However, the problem was solved by the present invention because the tires can be rotated once lifted into position.

Innovations within the prior art are rapidly being exploited in the field of ergodynamically engineered equipment to facilitate a mechanics job.

The present invention went contrary to the teaching of the art which describes and claims tire lifting and transporting devices.

The present invention solved a long felt need for a tire lifting and transporting device that is capable of tire rotation once the tire is lifted into position.

Accordingly, it is an object of the present invention to provide a tire dolly.

More particularly, it is an object of the present invention to provide a tire dolly which comprises a cross member.

In keeping with these objects, and with others which will become apparent hereinafter, one feature of the present invention resides, briefly stated, in the cross member comprising a cross member axle.

When the cross member axle is designed in accordance with the present invention, it has a cross member left tire securely attached at a left distal end thereto by a cross member left axle cap and a cross member right tire securely attached at a right distal end thereto by a cross member right axle cap.

Another feature of the present invention is that a left fork, aright fork are securely mounted to inner distal ends of the cross member. Also, a handle is securely mounted to the center of the cross member opposite the side of the forks. The handle is horizontal or level with the forks.

Yet another feature of the present invention is that the left fork comprises a left fork shaft having a left fork roller rotatably mounted thereon and securely fastened into position by a left fork cap.

Still another feature of the present invention is that the left fork shaft has a left fork outer washer slightly larger than the roller and a left fork inner washer mounted on opposite distal ends of the left fork roller. The inner washers are the same size as the roller.

Yet still another feature of the present invention is that the right fork comprises a right fork shaft having a right fork roller rotatably mounted thereon with a right fork cap securing the right fork roller thereto.

Still yet another feature of the present invention is that the right fork shaft comprises a right fork outer washer slightly larger than the roller and a right fork inner washer mounted on opposite distal ends of the right fork roller.

Another feature of the present invention is that the handle comprises an inner handle pivotally mounted to an outer handle.

Yet another feature of the present invention is that the pivot mounting means is a handle joiner comprising a handle joiner/pivot pin.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—tire dolly (10)
12—cross member (12)
12A—cross member axle (12A)
12AL—cross member left axle cap (12AL)
12AR—cross member right axle cap (12AR)
12CL—cross member left tire (12CL)
12CR—cross member right tire (12CR)
14L—left fork(14L)
14LA—left fork shaft (14LA)
14LB—left fork roller (14LB)
14LCA—left fork outer washer (14LCA)
14LCB—left fork inner washer (14LCB)
14LD—left fork cap (14LD)
14R—right fork(14R)
14RA—right fork shaft (14RA)
14RB—right fork roller (14RB)
14RCA—right fork outer washer (14RCA)
14RCB—right fork inner washer (14RCB)
14RD—right fork cap (14RD)
16—handle (16)
16A—inner handle (16A)
16B—outer handle (16B)
16C—handle joiner (16C)
16CA—handle joiner/pivot pin (16CA)

DESCRIPTION OF THE PREFERRED EMBODIMENT

Figure 1:
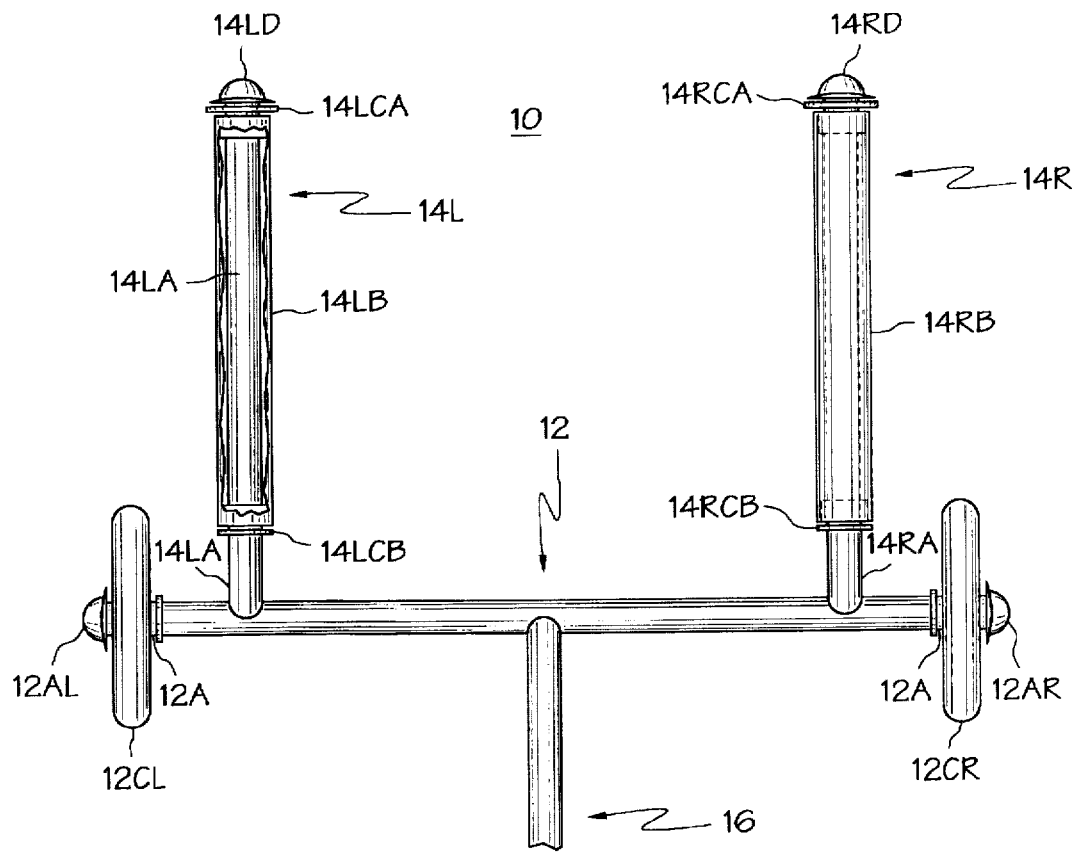
FIG. 1 is a top view of a tire dolly.
Figure 2:
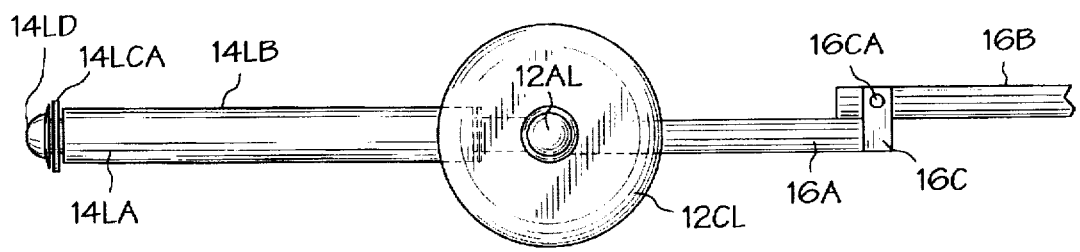
FIG. 2 is a left side view of a tire dolly.

Referring to FIG. 1 and FIG. 2 which are a top view and left side view of a tire dolly (10) a tire dolly (10) comprising a cross member (12) which comprises a cross member axle (12A). The cross member (12) further comprises a cross member left tire (12CL) securely mounted on a left distal end of the cross member axle (12A) by a cross member left axle cap (12AL) and a cross member right tire (12CR) securely mounted on a right distal end of the cross member axle (12A) by a cross member right axle cap (12AR). The tire dolly (10) further comprises a left fork (14L) which comprises a left fork shaft (14LA) securely mounted at an inner distal end onto the cross member (12).

The left fork (14L) further comprises a left fork roller (14LB) rotatably longitudinally disposed upon the left fork shaft (14LA). The left fork (14L) further comprises a left fork cap (14LD) securely mounted at an outer distal end of the left fork shaft (14LA) functioning to retain the left fork roller (14LB) thereon. The left fork shaft (14LA) comprises a left fork outer washer (14LCA) mounted between the left fork roller (14LB) and the left fork cap (14LD), the left fork shaft (14LA) further comprises left fork inner washer (14LCB) mounted between the left fork roller (14LB) and the cross member (12).

The tire dolly (10) further comprises a right fork (14R) which comprises a right fork shaft (14RA) securely mounted at an inner distal end onto the cross member (12). The right fork (14R) further comprises a right fork roller (14RB) rotatably longitudinally disposed upon the right fork shaft (14RA). The right fork (14R) further comprises a right fork cap (14RD) securely mounted at an outer distal end of the right fork shaft (14RA) functioning to retain the right fork roller (14RB) thereon. The right fork shaft (14RA) comprises a right fork outer washer (14RCA) mounted between the right fork roller (14RB) and the right fork cap (14RD), the right fork shaft (14RA) further comprises right fork inner washer (14RCB) mounted between the right fork roller (14RB) and the cross member (12).

The tire dolly (10) further comprises a handle (16) securely mounted onto the cross member (12). The handle (16) comprises an inner handle (16A) pivotally connected to an outer handle (16B). The pivotal connection comprises a handle joiner (16C) securely mounted on the inner handle (16A), the handle joiner (16C) comprises a handle joiner/pivot pin (16CA) pivotally mounting the outer handle (16B) thereto.

The left fork roller (14LB), the right fork roller (14RB), the cross member (12), the cross member axle (12A), the cross member left axle cap (12AL), the cross member right axle cap (12AR), the left fork (14L), the right fork (14R), and the handle (16) are manufactured from a material selected from a group consisting of metal, metal alloy, plastic, plastic alloy, fiberglass, epoxy, and carbon-graphite.

It will be understood that each of the elements described above, or two or more together, may also find a useful application in other types of constructions differing from the type described above.

While the invention has been illustrated and described as embodied in a tire dolly, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A tire dolly comprising:
   A) a cross member assembly comprising:
      i) a cross member axle having left and right outer ends, a left tire rotatably mounted over the left outer end of the cross member axle and secured in place by a left cross member axle cap, and a right tire rotatably mounted over the right outer end of the cross member axle and secured in place with a right cross member axle cap;
   B) a left fork assembly comprising:
      i) a left fork shaft having inner and outer ends, the inner end rigidly attached to the cross member axle adjacent to its left outer end and extending in a first direction;
      ii) a left fork roller having inner and outer ends, and being rotatably mounted and longitudinally disposed over the left fork shaft;
      iii) a left fork outer washer mounted on the left fork shaft adjacent the outer end of the left fork roller and a left fork inner washer mounted on the left fork shaft adjacent the inner end of the left fork roller, the left fork outer washer having a diameter greater than the diameter of the left fork roller to support the left fork roller a distance above a supporting surface; and
      iv) a left fork cap secured to the outer end of the left fork shaft for retaining the left fork roller and the left fork outer washer thereto;
   C) a right fork assembly comprising:
      i) a right fork shaft having inner end and outer ends, the inner end rigidly attached to the cross member axle adjacent to its right outer end and extending in a direction parallel to the first direction;
      ii) a right fork roller having inner and outer ends, and being rotatably mounted and longitudinally disposed over the right fork shaft;
      iii) a right fork outer washer mounted on the right fork shaft adjacent the outer end of the right fork roller and a right fork inner washer mounted on the right fork shaft adjacent the inner end of the right fork roller, the right fork outer washer having a diameter greater than the diameter of the right fork roller to support the right fork roller a distance above the supporting surface; and
      iv) a right fork cap secured to the outer end of the right fork shaft for retaining the right fork roller and the right fork outer washer thereto; and
   D) a handle assembly comprising:
      i) an inner handle member having inner and outer ends, the inner end rigidly attached to the cross member axle and extending in a direction opposite to the first direction;
      ii) an outer handle member having inner and outer ends,
      iii) a handle joiner attaching the outer end of the inner handle member to the inner end of the outer handle member for pivoting folding movements of the outer handle member with respect to the inner handle member.

* * * * *